3,813,271
BELT BUILDING DRUM
Robert S. Riggs, Stow, Ohio, assignor to The Goodyear Tire & Rubber Company, Akron, Ohio
Filed June 28, 1972, Ser. No. 266,897
Int. Cl. B29h 17/16, 17/20, 17/28
U.S. Cl. 156—417                         33 Claims

ABSTRACT OF THE DISCLOSURE

A segmented collapsible drum for building an endless inextensible belt assembly, optionally including a tread, for a tire. The drum features edge guides mounted in pairs on each segment of the drum. Pairs of the guides for a plurality of plies are disposed in alternating sequences about the drum and at differing radial heights above the drum surface to locate plies of differing widths as they are wrapped successively about the drum. Pairs of guides spaced radially outwardly from the drum surface are movable axially to overlie a wider inner ply and to locate a narrower outer ply. These latter pairs can then be moved axially outward to allow collapse of the drum and removal of the completed belt assembly.

---

The foregoing abstract is not to be taken as limiting the invention of this application, and in order to understand the full nature and extent of the technical disclosure of this application, reference must be made to the accompanying drawing and the following detailed description.

The invention relates to tire building apparatus and particularly to a drum for assembling or building an endless inextensible belt having a plurality of plies for a tire.

Certain tires, particularly tires commonly known as radial tires, require a belt or belt assembly which is relatively inextensible in a circumferential direction disposed between the carcass and the tread. Such belt assemblies may be assembled of two or more plies all of which are the same width. Other such belt assemblies require that the successive plies be of differing widths. In the building of such inextensible belt assemblies for certain tires, it is required that one or more of the radially outward plies be narrower than the next ply or other plies disposed inwardly thereof.

Because it is particularly important that the belt assembly be constructed to the required circumference within close limits and that each of the plies or parts thereof be disposed precisely with respect to the circumferential centerline of the belt, and of the tire in which the belt is destined to become a component, it is a principal object of the present invention to provide a belt building drum provided with guiding means by which each of the several plies of the belt assembly can be precisely located with respect to the mid-circumferential centerline of such assembly.

The foregoing and other objects and advantages which will become apparent or be particularly pointed out as the description proceeds are accomplished in accordance with the invention by tire building apparatus comprising a drum for building an endless inextensible belt assembly which drum is provided with a plurality of segments defining in a belt building position a cylindrical building surface, each segment being mounted for movement radially inwardly relatively of said position, a plurality of pairs of edge guide members mounted on said segments each member having a radially and arcuately extending guide surface disposed in a plane normal to the axis of said cylindrical building surface and facing axially inwardly, the respective pairs of members being mounted for movement parallel to said axis between adjustably fixed axial positions and toward and away from each other. In a further aspect of the invention, the respective guide surfaces of at least two pairs of members mounted on the segments are disposable radially outwardly of said building surface sufficiently to overlie a radially inner ply of said belt assembly and to touch the edges of a radially outer and narrower ply of said assembly. Means for mechanically moving certain of said guide surfaces axially away from each other to permit radially inward movement of said segments without interference with the completed belt assembly are also provided.

In the description which follows of certain preferred embodiments of the invention being claimed herein, reference is made to the attached drawings in which:

Figure 1:
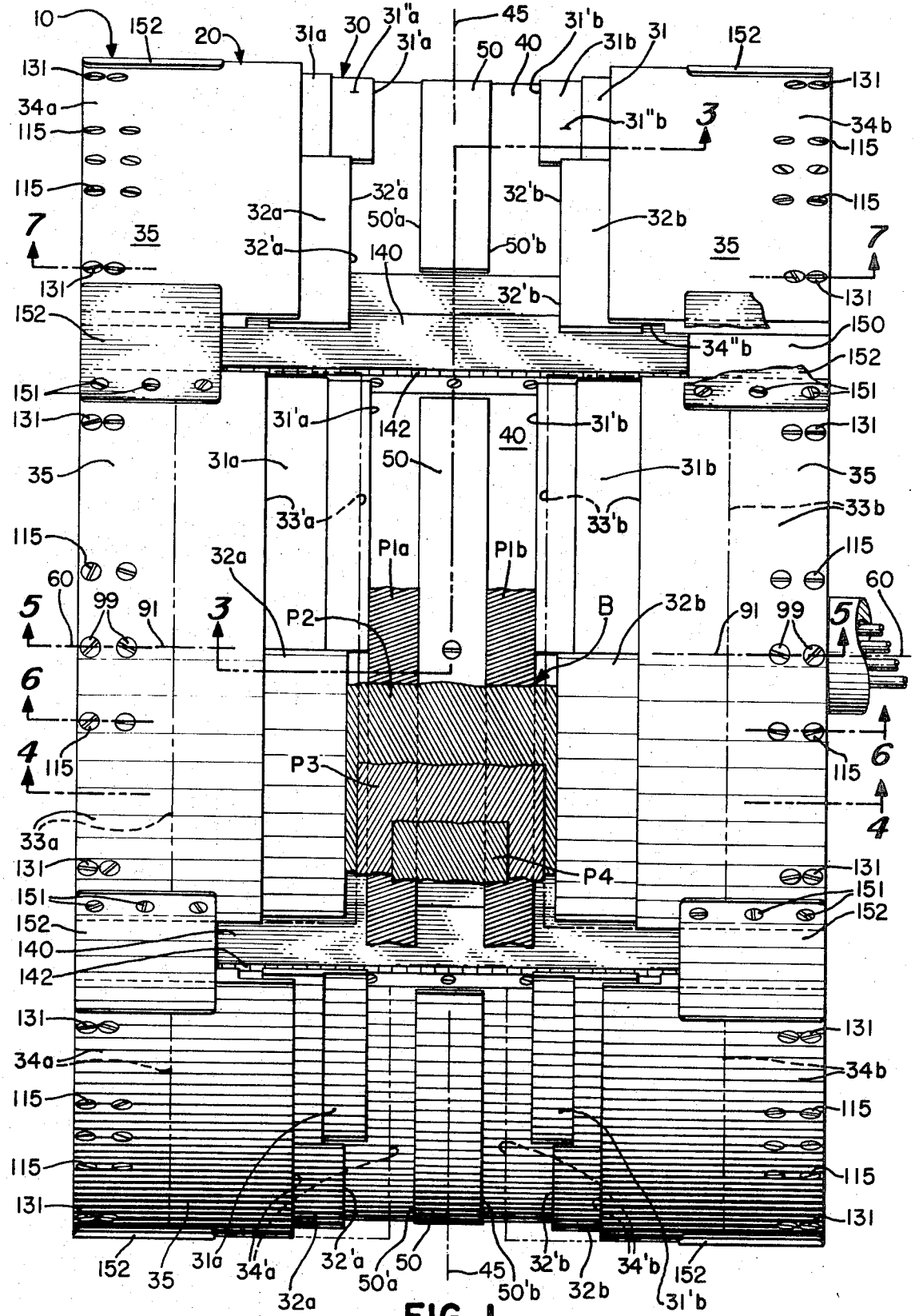
FIG. 1 is a front elevation of a belt building drum in accordance with the invention, parts having been removed or broken away to show certain details.
Figure 2:
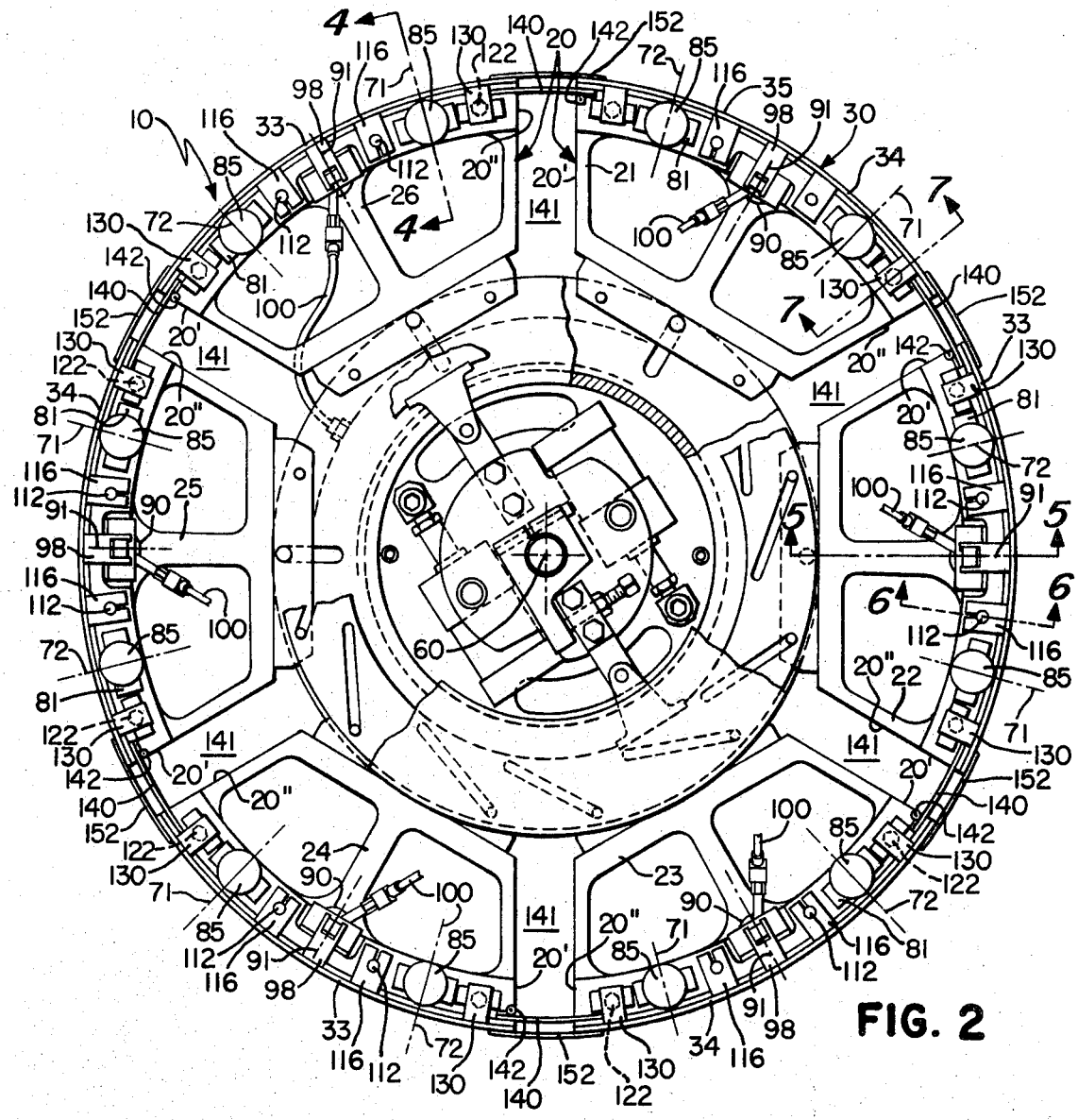
FIG. 2 is an end elevation of the drum of FIG. 1.

FIGS. 3, 4, 5, 6, and 7 are respectively sectional views of the drum of FIG. 1 taken as indicated by the correspondingly numbered section lines in FIGS. 1 and 2.

Figure 3:
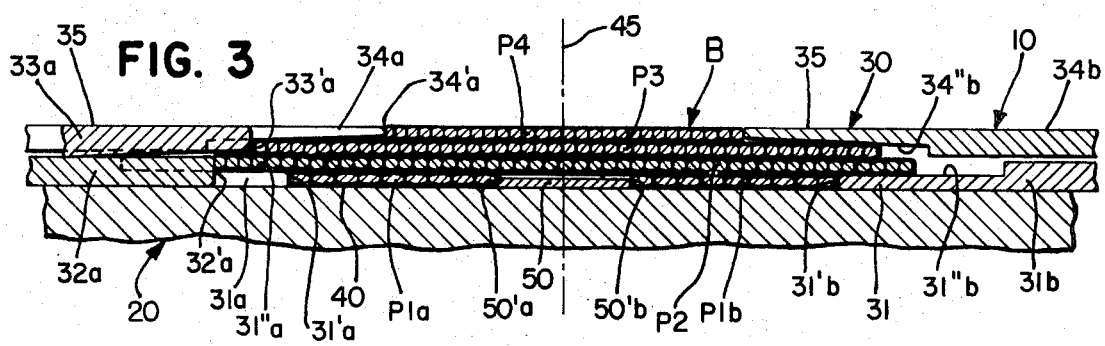

Making reference to the drawings, and particularly to FIGS. 1, 2, and 3, the belt building drum 10 according to the invention comprises a plurality of radially movable segments, collectively designated by the numeral 20 and individually in clockwise sequence in FIG. 2 by the numerals 21–26. To illustrate features of the invention, an axial cross-section of a particular inextensible belt assembly B is shown in position on the drum 10 in FIG. 3.

The edge guide members collectively designated by the numeral 30 and individually by the numerals 31–34, are mounted on the drum 10 to cooperate with the cylindrical drum surface 40. In FIG. 3, the guide members 31b and 34b illustrating axial sections typical of the alternate segments 21, 23, and 25 are seen at the right of the mid-circumferential centerline or plane 45. At the left of the plane 45, guide members 32a and 33a illustrate axial sections typical of the segments 22, 24, and 26. Each of the guide members 31 and 32, in the present example, are arcuate sections of cylindrical shells having inside diameters equal (with allowance for axial sliding movement) to the aforesaid belt building surface and outside diameters at least approximately equal to the outside diameter of the second ply P2 of the belt assembly B. Each of the guide members 33 and 34, herein are also arcuate sections of cylindrical shells having inside diameters only slightly greater than the outside diameters of the members 31 and 32 (for axial movement relative thereto) and outside diameters, of the exterior surface 35, at least approximately equal to the outside diameter of the fourth ply P4 of the belt assembly B.

As will be noted, each segment 20 carries a pair ($a$ and $b$) of guide members 31 and a pair ($a$ and $b$) of guide members 32; the pairs ($a$ and $b$) of guide members 33 are carried only on the segments 22, 24, and 26; the pairs ($a$ and $b$) of guide members 34 are carried only on the segments 21, 23, and 25. For convenience in description, elements of the apparatus disposed to the left hand of the plane 45 as seen in FIG. 1, are identified by numerals accompanied by the letter $a$, and like elements disposed to the right of the plane 45 have the letter $b$ accompanying the numeral identifying the element.

The assembly B includes a first ply P1 which is disposed in circumferential and axial contact with the belt building surface 40 of the drum and comprises two elements P1$a$ and P1$b$, the respective axially outward edges of which are disposed in contact with the edge guide surfaces 31'$a$, 31'$b$ of the first ply guide members 31. Because, in the specific embodiment here described, the first ply of the belt assembly B is formed of two axially spaced elements, a spacer guide 50 is fixed on each segment 20. The guide 50 extends over the whole arc of each respectively associated segment 20 and axially between radial plane surfaces 50′a, 50′b normal to the axis 60 and spaced to suit the desired axial space between the elements P1a, P1b. The radial thickness of the spacer guide 50 at least approximately equals the thickness of the first ply P1 elements and so serves also to support the second and subsequent overlying plies during the building of the belt assembly B.

Each of the guide members 31 terminates in an axially spaced apart and opposed relation on each of the six segments 21-26 to extend arcuately over about one-half of the arcuate length of each respective segment and in close conformity to the surface 40 thereof. In like manner, a pair of second ply guide members 32 is mounted on each of the six segments 21-26 to extend arcuately over about the other half of the arcuate length of each respective segment in conformity to the surface 40. The respective pairs of members 31 and 32 are disposed in alternating sequence circumferentially about the drum 10.

Each of the guide members 31 terminates in an axially inwardly facing edge guide surface 31′ extending in directions circumferentially of the drum and radially a distance and height corresponding to the radial height and thickness of the first ply P1. The circumferential surface 31″ of each member 31 extends axially outwardly, at a radial height equal to the thickness of P1, a distance sufficient to accommodate the greater width of the second ply P2 and is there increased to a radial thickness at least approximately equal to the combined radial thickness of plies P1 and P2.

Each guide member 32 terminates axially inwardly in a ply edge guide surface 32′ disposed in a plane normal to the axis 60 of the drum and extending arcuately in directions circumferentially of the drum and radially to correspond with the radial thickness and location of the second ply P2.

An axially opposed pair of guide members 33, each extending arcuately over about the entire arc of the segment, is mounted on each of the segments 22, 24, 26. Each guide member 33 extends axially inwardly to terminate in a ply edge guide surface 33′ disposed in a plane normal to the drum axis 60. The edge guide surface 33′ extends arcuately in directions circumferentially of the drum and radially a distance corresponding in thickness and radial elevation to the thickness and location of the third ply P3 above the surface 40.

In like manner, an axially opposed pair of guide members 34 is mounted on each of the segments 21, 23, and 25. Each member 34 terminates axially inwardly in an edge guide surface 34′ disposed in a plane normal to the drum axis 60 and extends arcuately in directions circumferentially of the drum and radially a distance corresponding in thickness and in elevation above the surface 40 to the fourth ply P4. Each of the members 34 includes a cylindrical surface 34″ extending axially outwardly from the edge guide surface 34′ at a radial height and to a distance sufficient to accommodate the next underlying and wider ply P3 and therefrom axially outwardly at a radius equal to the radius of the inner circumference of the members 33. The exterior circumferential surfaces 35 of the members 33 and 34 are disposed at a height radially above the surface 40 equal to each other and about equal, as has been mentioned, to the combined thickness of the plies P1, P2, P3, and P4 comprising the belt assembly B.

Summarizing, each of the segments 21-26 carries one pair of axially opposed edge guide members 31a and 31b, and one pair of edge guide members 32a and 32b. In addition, the segments 22, 24, and 26 each carry one pair of edge guide members 33a and 33b; while segments 21, 23, and 25 each additionally carry one pair of the edge guide members 34a and 34b. The edge guide members 31 and 32 are disposed in alternating circumferential sequence about the drum. In like manner, the edge guide members 33 and 34 are disposed in alternating sequence circumferentially about the drum. Each of the respective edge guide members 30 is mounted on a respectively associated segment 20 for movement radially therewith. Additionally, each of the guide members 30 is movable axially relatively of the drum and the associated segment. Each member 30 is movable axially relatively of other members 30 as well.

Figure 4:
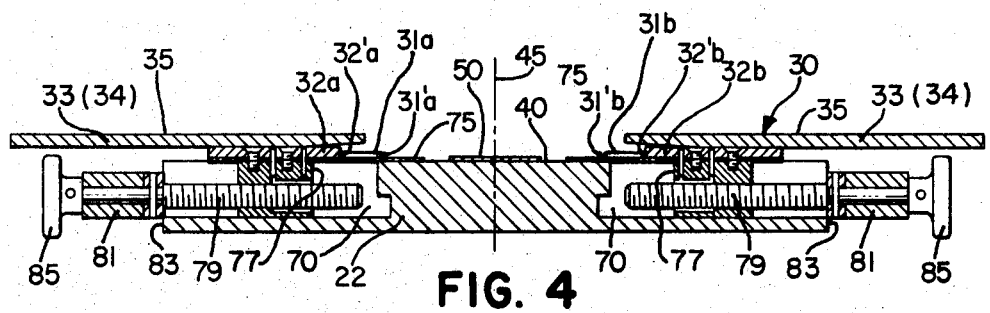

Making reference to FIG. 4; each of the segments 20 is provided with an axially extending and aligned pair of T-slots 70 disposed at about the axial centerline 71 of the respectively associated overlying guide member 31, and a second pair of identical axially aligned T-slots 70 disposed at about the axial centerline 72 of the respectively associated guide members 32. A thin metal cover plate 75 is secured respectively to each T-block 77 which is axially slidable in the respectively associated T-slot, the plate 75 serving to bridge over any exposed opening to the T-slot. An axially opposed pair of guide members 31 are secured to the respective axially aligned T-blocks illustrated in FIG. 4 each of which is threadedly engaged by an adjustment screw 79 carried in a bracket 81 mounted on the sidewall 83 of each segment 20. An axially opposed pair of guide members 32 are secured in the same manner to T-blocks 77 slidably carried in the second pair of T-slots 70. Each screw 79 has a corotatable adjustment handwheel 85 secured thereon. The axial location of the respective edge guide surfaces 31′ and 32′ are adjusted toward and away from the midcircumferential plane 45 by manual rotation of the wheel 85 in the appropriate sense.

It will be apparent that only relatively minor modification, within the contemplated scope of the invention, is required to adapt the edge guide members 31 and 32 to suit any combination of widths of a first and second ply of a belt for a tire. It is likewise contemplated that the manual adjustment of the guide members 31 and 32 described can as well be accomplished by remotely energized devices such as air cylinders.

Figure 5:
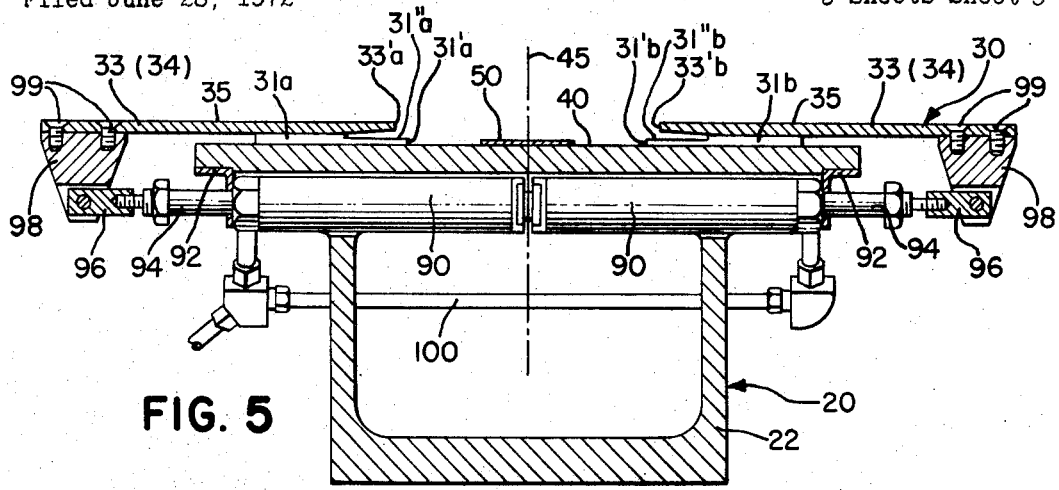
Figure 6:
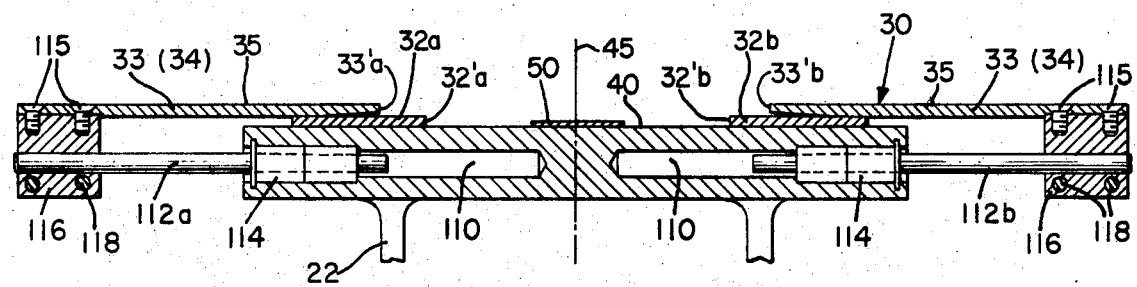
Figure 7:
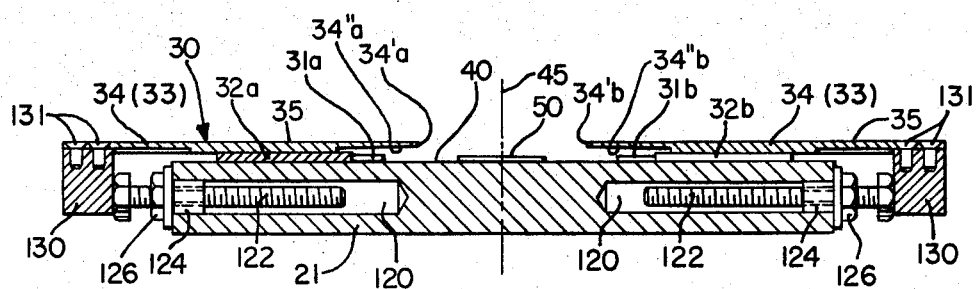

Turning to FIGS. 5, 6, and 7; each segment 20 is provided with a pair of opposed axially extending air cylinders 90 (FIG. 5) coplanar with the axial plane 91 containing the centerline of the respective segment 20 and fixed thereon by suitable brackets 92. In the presently preferred apparatus, the cylinders 90 are single acting each having a piston rod 94 extended axially outwardly under the influence of an internal spring (not shown) and retracted axially inwardly by air pressure applied in the rod end of each cylinder. Each piston rod 94 carries a clevis 96 which is pin-connected to a mounting block 98. The cylinders 90 mounted as described in the respective segments 22, 24, and 26 have guide members 33 respectively secured by the screws 99 to the block 98. In like manner, the air cylinders 90 mounted on the segments 21, 23, and 25 carry the respective pairs of guide members 34 securely affixed to the respective blocks 98.

To move the guide members 33 axially inwardly, air is admitted by way of a manual valve (not shown) to the air conduits 100 connected to the respective cylinders 90 in the segments 22, 24, and 26.

Upon the relase of air by the valve, the return springs contained in the cylinders move the guide members 33 axially outwardly. The guide members 34 are moved axially inwardly in like manner by manipulation of a second valve independently of the first mentioned valve, to admit air to the cylinders 90 mounted in the segments 21, 23, and 25, the air being released by the valve to permit the return springs of the cylinders to move the guide members 34 axially outwardly.

Each of the segments 20 is provided with two pairs of axially aligned holes 110 (FIG. 6) accommodating guide rods 112 (a and b) mounted slidably in bushings 114, preferably of the recirculating ball type, retained in the respective holes, the guide rods being spaced angularly on either side of the axial plane 91 occupied by the respectively associated cylinders 90. Each of the guide members 33 and 34 has affixed at its axially outward portion by the screws 115 and attachment block 116 extending radially inwardly in which the axially outward end of the respectively associated guide rod 112 is clamped by the screws 118.

The segments 20 each further include a pair of axially aligned bores 120 (FIG. 7) spaced angularly outward of the axial centerline 71, 72 respectively of the guide members 31 and 32. A stop bolt 122 is threaded into a nut 124 fixed in the axially outward end of each bore 120 to provide an axially adjustable stop, fixed by the common lock nuts 126 respectively threaded on the bolts, which cooperates with a stop block 130 attached by the screws 131 to extend radially inwardly of the axially outward portion of each guide member 33 and 34.

Axial movement of each guide member 33 and 34 is controlled respectively by the cooperation of the guide rod 112 within the bushing 114 during movement in response to actuation of the cylinder 90 and is limited in axially inward movement by the abutment of the stop block 130 and the stop screw 122.

Referring again to FIGS. 1 and 2; to provide continuity of the cylindrical building surface 40, each segment 20 has affixed at one of its ends 20' a bridge plate 140 which spans the space 141 between circumferentially adjacent pairs of segments 20. The bridge plate 140 is attached by a piano-type hinge 142 secured to one segment 20 of each adjacent pair and slidably overlies the end 20" of the other to accommodate the radial movement of the respective segments 20.

To bridge the gap 150 between adjacent pairs of guide members 33, 34 each guide member 33 has affixed, as by the screws 151, thin arcuate plates 152 which extend across the gaps 150 and slidably engage the circumferential surfaces 35 of the respectively adjacent guide members 34. The plates 152 function primarily to enhance safety of the operator.

In operation, the drum is expanded to provide a cylindrical surface 40 concentric with the drum axis 60 and of a diameter suitably related to the tire of which the belt assembly is a component. The guide members 31 and the guide members 32 are adjusted to locate the respective edge guide surfaces 31' and 32' with respect to the mid-circumferential plane 45 of the drum 10. The edge guide surfaces 31'a, 31'b and 32'a, 32'b respectively are disposed alternately around the drum 10.

The element or elements P1a, P1b of the first ply are then wrapped about the drum with their respective lateral edges touching the edge guide surfaces 31'a, 31'b and the surfaces 50'a, 50'b, and are spliced to endless circumferential form in the usual manner. The second ply component is then laid about the drum and the first ply element such that its respective edges are positioned in contact with the edge guide surfaces 32'a, 32'b and the respective ends of the second ply are spliced.

While in the illustrative example being described, the second ply is of greater width than the first ply in accordance with the dictates of the tire designer, it will be apparent that the respective guide members 30 can be assembled in any suitable sequence and that all or any combination of the individual guide members can be provided with remote controlled and/or powered operation in the event that the respective widths of the successive ply layers be different than that given here by way of illustration.

After the splicing of the second ply has been completed, the guide members 33 are moved axially inwardly to their correct positions by manipulation of the appropriate air valve and the third ply is wrapped about the preceding plies and then spliced. The guide members 34 are then in their turn moved axially inwardly to their respectively preset positions and the fourth ply wrapped about the drum and spliced.

In the normal use of the drum, an appropriate length of tread slab will next be wrapped about the drum and spliced, the radially outward surfaces 35 cooperating to define a cylindrical surface continuous with the cylindrical surface of the outermost or fourth ply of the belt assembly, and is in the usual manner spliced to form an endless tread.

The valves respectively controlling the guide members 33 and the guide members 34 are then operated to withdraw the respective guide members axially outwardly to their remote lateral positions beyond the laterally extreme edges of the belt assembly.

Upon completion of the belt and tread assembly or of the belt assembly alone and the withdrawal as mentioned of the guide members axially outwardly, the drum 10 is collapsed radially inwardly, each of the segments 20 together with the respective guide members being moved radially inwardly, and the belt assembly, preferably being supported by transfer means (not shown), is removed from the drum.

While certain representative embodiments and details have been shown for the purpose of illustrating the invention, it will be apparent to those skilled in the art that various changes and modifications may be made therein without departing from the spirit or scope of the invention.

What is claimed is:

1. Tire building apparatus comprising a drum for building an endless inextensible belt assembly of a plurality of belt plies for a tire, said drum having a plurality of segments cooperable to define in one position of said segments a cylindrical belt building surface, said segments being mounted for movement radially inwardly of said position, a plurality of pairs of opposed edge guide members mounted on said segments for movement radially therewith, said segments and edge guides forming annular slots for locating each ply of the belt.

2. Tire building apparatus as claimed in claim 1, said members being movable axially relatively of said drum.

3. Tire building apparatus as claimed in claim 1, each of said members having a ply edge guide surface extending in directions circumferentially of the drum and radially commensurately with the radial thickness of a respectively associated ply of said belt.

4. Tire building apparatus as claimed in claim 1, the pairs of said members associated with an overlying ply for guiding the placement of the edges thereof onto said drum alternating circumferentially of said drum with pairs of said members associated with an underlying ply of said belt for guiding the placement of the edges thereof onto said drum.

5. Tire building apparatus as claimed in claim 1, including means connected to each of said members to adjust axially the location of said guide surfaces.

6. Tire building apparatus as claimed in claim 1, each said segment having a plurality of said pairs of members mounted thereon.

7. Tire building apparatus as claimed in claim 1, including means for moving at least one member of at least one pair of said plurality of pairs thereof axially of the drum relative to the other member of such pair.

8. Tire building apparatus as claimed in claim 7, said means for moving including means responsive to a manual control unit situated apart from said drum connected to move selected pairs of said members axially of said drum.

9. Tire building apparatus as claimed in claim 8, each said segment having a plurality of said pairs of members mounted thereon.

10. Tire building apparatus as claimed in claim 1, each member of said pairs of members associated with an overlying radially outward one of said plies being movable axially of the drum to extend inwardly of the members of said pairs thereof associated with an underlying radially inward one of said plies so as to overlie said inward one of said plies.

11. Tire building apparatus as claimed in claim 10, including means for moving selected ones of said members axially of the drum relative to other ones of said members.

12. Tire building apparatus as claimed in claim 11, said means for moving including means responsive to a manual control unit situated apart from said drum connected to move each member of selected pairs of said members axially of said drum.

13. Tire building apparatus as claimed in claim 10, each said member having a ply edge guide surface extending in directions circumferentially of the drum and radially commensurately with the radial thickness of a respectively associated ply of said belt.

14. Tire building apparatus as claimed in claim 10, the pairs of said members associated with an overlying ply for guiding the placement of the edges thereof onto said drum alternating circumferentially of said drum with pairs of said members associated with an underlying ply of said belt for guiding the placement of the edges thereof onto said drum.

15. Tire building apparatus as claimed in claim 14, including means connected to each of said members to adjust axially of the drum the location of said guide surfaces.

16. Tire building apparatus as claimed in claim 15, said means including a plurality of air cylinders.

17. Tire building apparatus as claimed in claim 10, each said segment having two circumferentially adjacent pairs of said members mounted thereon and a third pair of said members overlying and movable axially of the drum relative to each of said two pairs thereof.

18. Tire building apparatus as claimed in claim 17, including means for moving selected one of said members axially of the drum relative to other ones thereof.

19. Tire building apparatus as claimed in claim 18, said means for moving including means responsive to a manual control unit situated apart from said drum connected to move selected pairs of said members axially of said drum.

20. Tire building apparatus as claimed in claim 19, said pairs of said members associated with an overlying ply for guiding the placement of the edges thereof onto said drum alternating circumferentially of said drum with pairs of said members associated with an underlying ply of said belt for guiding the placement of the edges thereof onto said drum.

21. Tire building apparatus as claimed in claim 20, each said member having a ply edge guide surface extending circumferentially of the drum and radially commensurately with the radial thickness of a respectively associated ply of said belt.

22. Tire building apparatus comprising a radially movable segmented drum for building an endless belt of a plurality of belt plies, the drum comprising a plurality of segments cooperable to define a belt building surface, at least one pair of ply edge guide members mounted on each segment in opposing relation axially of the drum, each member of such at least one pair having a ply edge guide surface disposable to engage a circumferentially extending edge of a belt ply laid about the drum, at least an other pair of ply edge guide members disposed in sequential relation relative to said one pair of members circumferentially of the drum and in opposing relation axially of the drum, each member of such other pair having a ply edge guide surface disposable to engage a circumferentially extending edge of an other belt ply laid about the drum.

23. Tire building apparatus as claimed in claim 22, each of said segments comprising means responsive to a manual control unit situated apart from said drum to move at least one of said members axially of the drum.

24. Tire building apparatus as claimed in claim 23, said remotely energizable means comprising an air cylinder mounted on said segment and connected to move a respectively associated member.

25. Tire building apparatus as claimed in claim 22, each segment comprising slide means supporting at least one of said members for movement axially of the drum.

26. Tire building apparatus as claimed in claim 25, said slide means comprising a pair of rods attached to each member and extending parallel to and radially inwardly of the drum surface, and a slide bearing slidably receiving each said rod and fixed in said segment to support said rod and the member attached thereto for movement axially of said drum.

27. Tire building apparatus as claimed in claim 25, additionally comprising means responsive to a manual control unit situated apart from said drum to move at least one member axially of the drum.

28. Tire building apparatus as claimed in claim 27, said remotely energizable means comprising an air cylinder mounted on said segment and connected to move a respectively associated member.

29. Tire building apparatus as claimed in claim 25, additionally comprising adjustably fixed means for positioning at least one guide member axially of the drum.

30. Tire building apparatus as claimed in claim 29, said adjustably fixed means comprising a screw extending parallel to and radially inwardly of the drum surface.

31. Tire building apparatus as claimed in claim 23, additionally comprising adjustable stop means cooperable with said remotely energizable means to limit axial movement of at least one member axially inwardly of the drum.

32. Tire building apparatus as claimed in claim 22, each said guide member comprising a portion of a cylindrical shell coaxial with said drum, each said portion having an inner and an outer cylindrical surface and a pair of arcuately spaced edges extending parallel to the drum axis and at least one edge extending circumferentially of the drum in a plane perpendicular to said axis, and means for mounting such guide member on a segment of the drum for movement parallel to said axis.

33. Tire building apparatus as claimed in claim 32, at least one pair of such guide members each member of such pair having a cylindrical surface disposed coaxially of the drum at a radius intermediate the radii of the outer and inner circumferential surfaces of said shell, said cylindrical surface extending axially of said drum outwardly of said circumferentially extending edge.

References Cited

UNITED STATES PATENTS

| | | | |
|---|---|---|---|
| 3,485,692 | 12/1969 | Frazier | 156—123 |
| 1,374,505 | 4/1921 | Hopkinson | 156—123 |
| 1,801,759 | 4/1931 | Steinle | 156—123 |
| 1,734,835 | 11/1929 | Strum | 156—419 |
| 2,042,498 | 6/1936 | Bostwick | 156—419 |
| 3,492,184 | 1/1970 | Brey et al. | 156—414 |
| 3,375,154 | 3/1968 | Ruttenberg et al. | 156—418 |
| 1,588,585 | 6/1926 | Kearns et al. | 156—123 |
| 1,759,232 | 5/1930 | Gammeter | 156—394 |
| 2,588,207 | 3/1952 | Cleland et al. | 156—126 |
| 2,139,840 | 12/1938 | McKone | 156—123 |

CLIFTON B. COSBY, Primary Examiner

J. E. KITTLE, Assistant Examiner

U.S. Cl. X.R.

156—123, 128 I, 137, 414, 420